Dec. 16, 1930.   J. P. FRANK   1,785,378
CASH REGISTER
Filed Jan. 28, 1926   12 Sheets-Sheet 1

Inventor
John P. Frank
By
His Attorneys

Dec. 16, 1930.  J. P. FRANK  1,785,378
CASH REGISTER
Filed Jan. 28, 1926    12 Sheets-Sheet 2

Inventor
John P. Frank
By Carl Benst
Harry E. Stauffer
His Attorneys

Dec. 16, 1930.  J. P. FRANK  1,785,378
CASH REGISTER
Filed Jan. 28, 1926   12 Sheets-Sheet 3
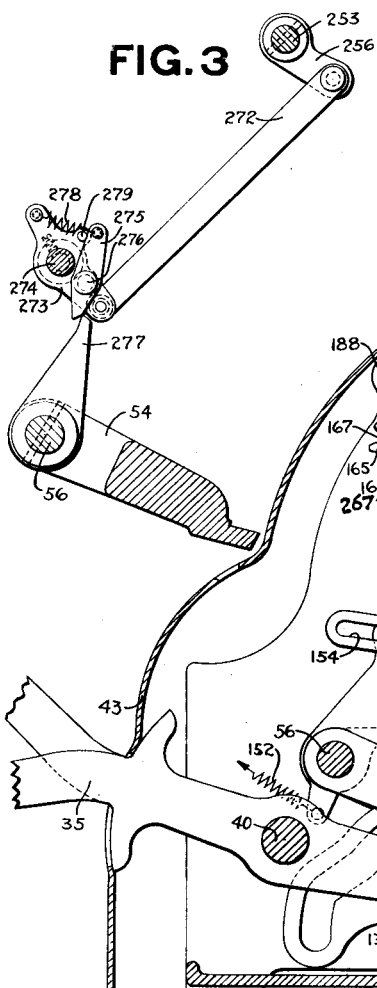
Inventor
John P. Frank
By Carl Beust
Henry E. Stauffer
His Attorneys Dec. 16, 1930.  J. P. FRANK  1,785,378
CASH REGISTER
Filed Jan. 28, 1926  12 Sheets-Sheet 4
FIG. 6
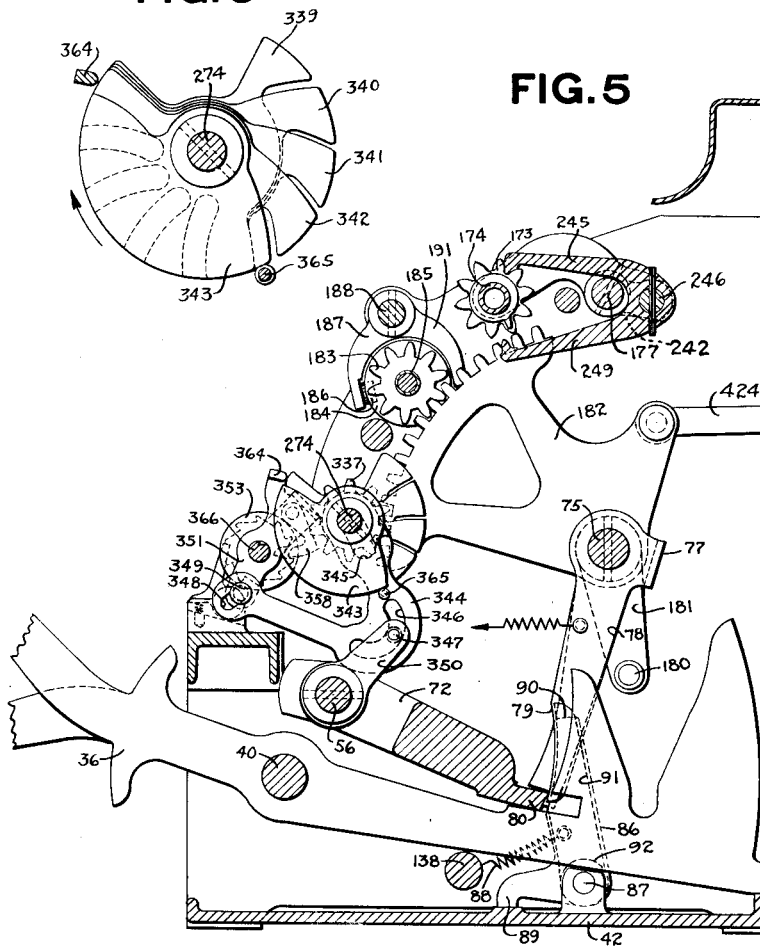
FIG. 5
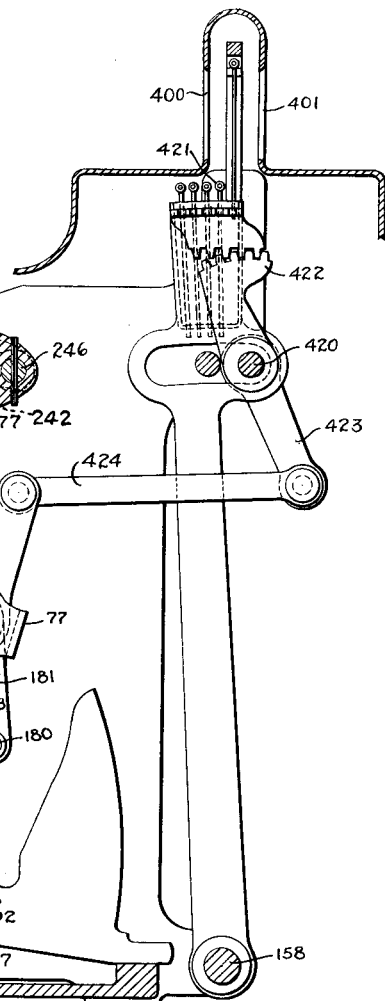
FIG. 7  FIG. 8
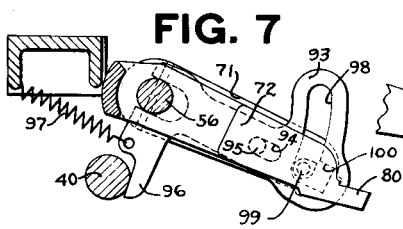
Inventor
John P. Frank
By Carl Beust
Henry Stauffer
His Attorneys Dec. 16, 1930.    J. P. FRANK    1,785,378
CASH REGISTER
Filed Jan. 28, 1926    12 Sheets-Sheet 5

Inventor
John P. Frank
By *Hearl Benst*
*Henry E. Stauffer*
His Attorneys

Dec. 16, 1930.   J. P. FRANK   1,785,378
CASH REGISTER
Filed Jan. 28, 1926   12 Sheets-Sheet 7
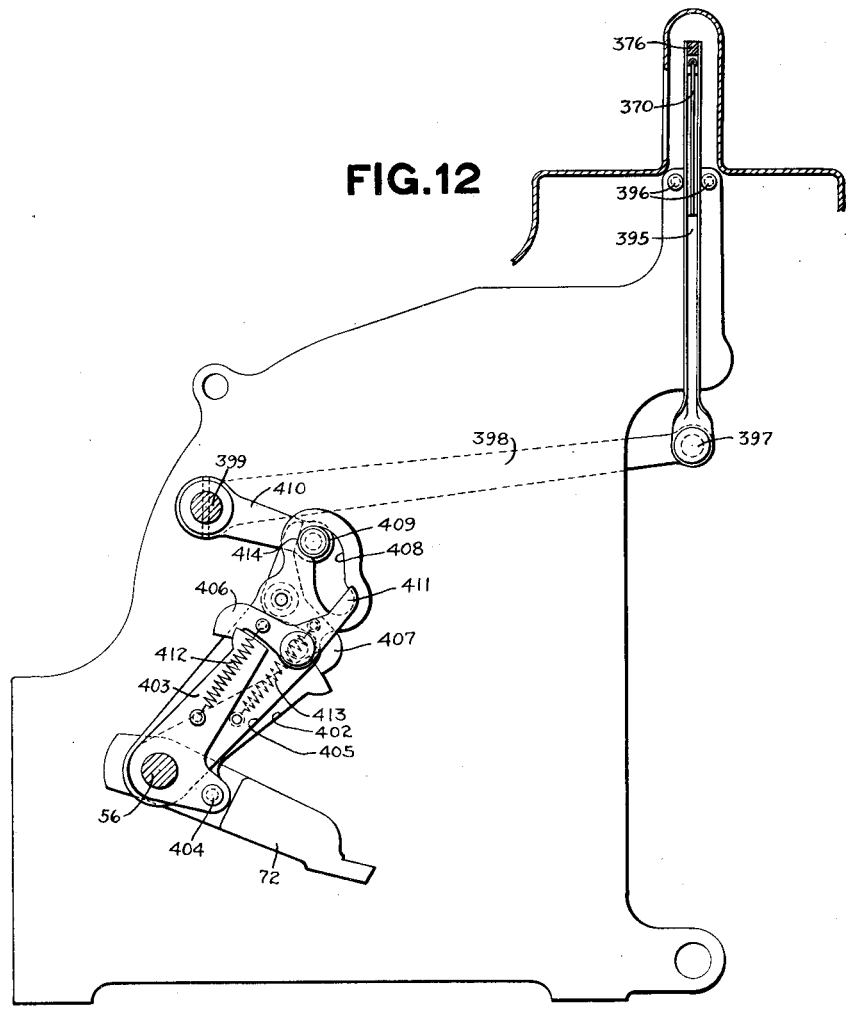
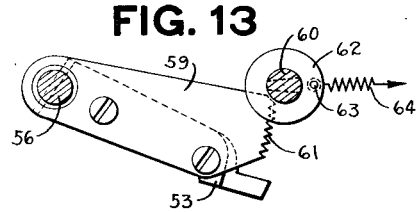
Inventor
John P. Frank
By Karl Benst
Henry E Stauffer
His Attorneys Dec. 16, 1930.  J. P. FRANK  1,785,378
CASH REGISTER
Filed Jan. 28, 1926  12 Sheets-Sheet 8
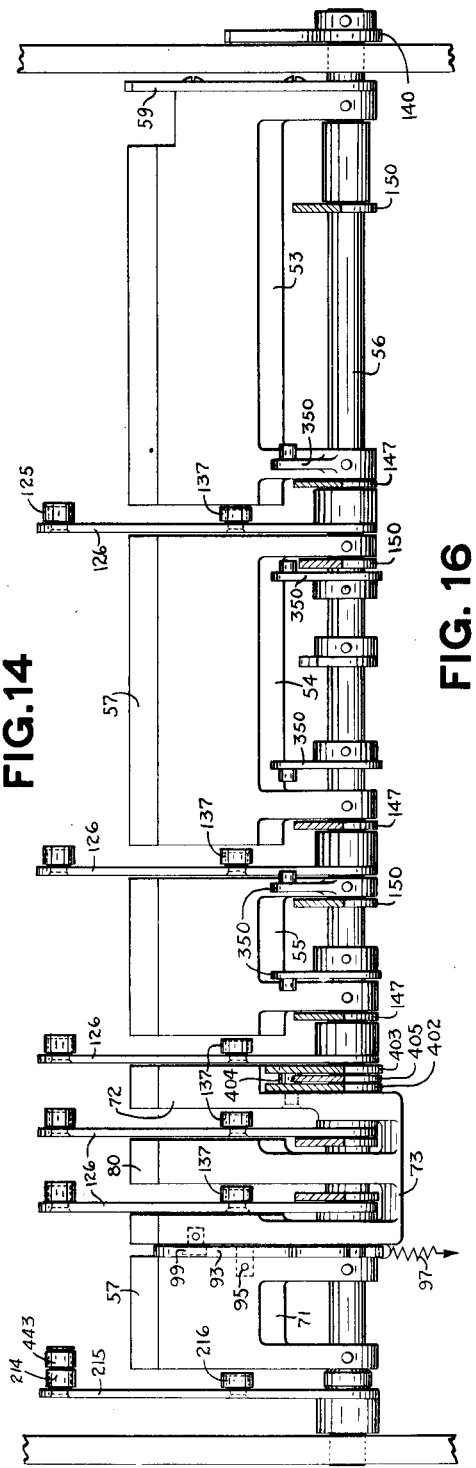
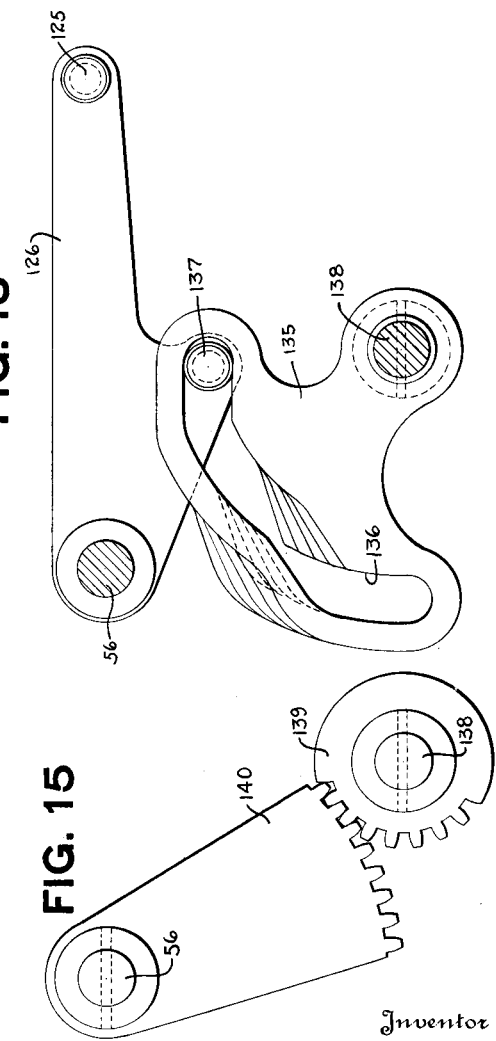
Inventor
John P. Frank
By Carl Beust
Henry E Stauffer
His Attorneys Dec. 16, 1930.   J. P. FRANK   1,785,378
CASH REGISTER
Filed Jan. 28, 1926   12 Sheets-Sheet 9

Inventor
John P. Frank
By Pearl Beust
Henry E Stauffer
His Attorneys

Dec. 16, 1930.  J. P. FRANK  1,785,378
CASH REGISTER
Filed Jan. 28, 1926   12 Sheets-Sheet 10

Inventor
John P. Frank
By Earl Benst
Henry E. Stauffer
His Attorneys

Dec. 16, 1930.  J. P. FRANK  1,785,378
CASH REGISTER
Filed Jan. 28, 1926  12 Sheets-Sheet 11

Inventor
John P. Frank
By
His Attorneys

Patented Dec. 16, 1930

1,785,378

UNITED STATES PATENT OFFICE

JOHN P. FRANK, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed January 28, 1926. Serial No. 84,350.

This invention relates to cash registers and like machines, and more particularly to machines of the lever key type.

It is an object of this invention to provide a mechanism for recording business transactions involving various classifications.

Another object is to provide a totalizer for each classification of transactions, with mechanism for positioning type wheels to print the items entered in the totalizers, and also the amounts accumulated on the various totalizers.

Another object is to provide mechanism operated by lever keys for automatically positioning type wheels corresponding to amounts on various totalizers and simultaneously resetting the totalizers to zero.

Another object is to provide counting mechanism for counting the number of transactions in each classification.

Another object is to provide mechanism for locking the amount keys until a transaction key is operated, and then to lock the transaction key in operated position until an amount key is operated.

With these and incidental objects in view, the invention consists in certain novel features of construction and combinations of parts, the essential elements of which are set forth in appended claims, and a preferred form or embodiment of which is hereinafter described with reference to the drawings which accompany and form part of the specification.

Of said drawings:

Figs. 1A and 1B taken together constitute a plan view of the machine with certain parts omitted for clearness.

Fig. 2 is a transverse sectional view of the machine taken on line 2—2 of Fig. 1B, looking in the direction of the arrows, and showing the actuating mechanism for the tens denomination wheel of the totalizer.

Fig. 3 is a detail view of the totalizer transfer restoring mechanism.

Fig. 4 is a detail view of the rear ends of a group of amount keys showing the differential graduations.

Fig. 5 is a transverse sectional view of the machine taken approximately on the line 5—5 of Fig. 1A, looking in the direction of the arrows, and showing the totalizer and counter selecting mechanism.

Fig. 6 is an enlarged detail view of the counter selecting discs.

Fig. 7 is a detail view of the latching mechanism between the item key coupler member and the transaction key coupler member.

Fig. 8 is a detail view of the rear ends of the transaction keys showing the differential graduations.

Fig. 12 is a detail view of the mechanism for operating the indicators from the transaction key coupler.

Fig. 13 is a detail view of the key coupler member full-stroke device.

Fig. 14 is a detail plan view of the key couplers and various other parts on the key coupler shaft.

Fig. 15 is an enlarged detail view of the cam shaft oscillating mechanism.

Fig. 16 is an enlarged detail view of the totalizer actuating segment operating mechanism.

Figure 24A:
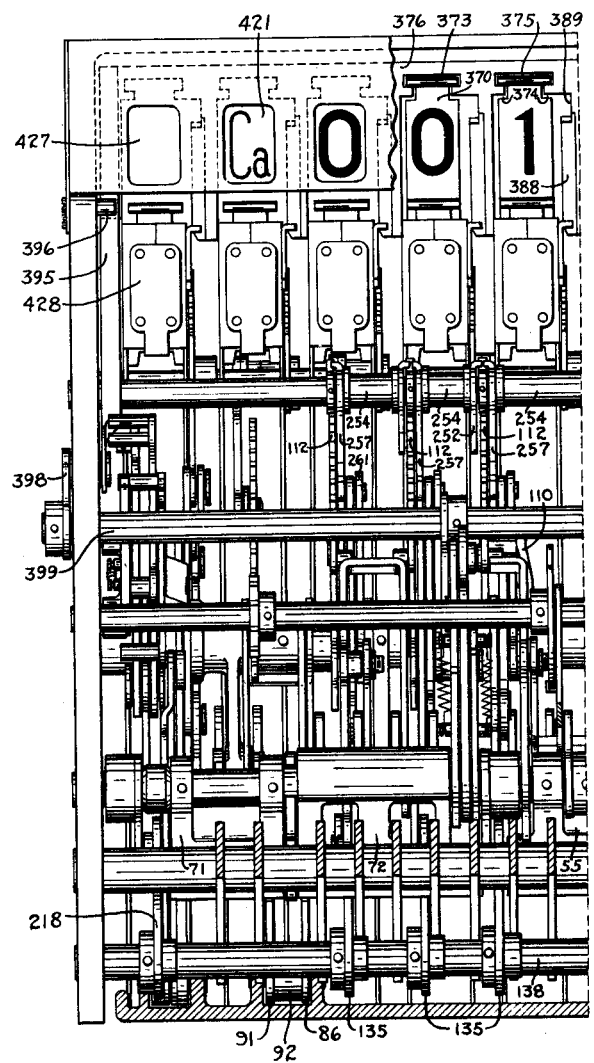
Figure 24B:
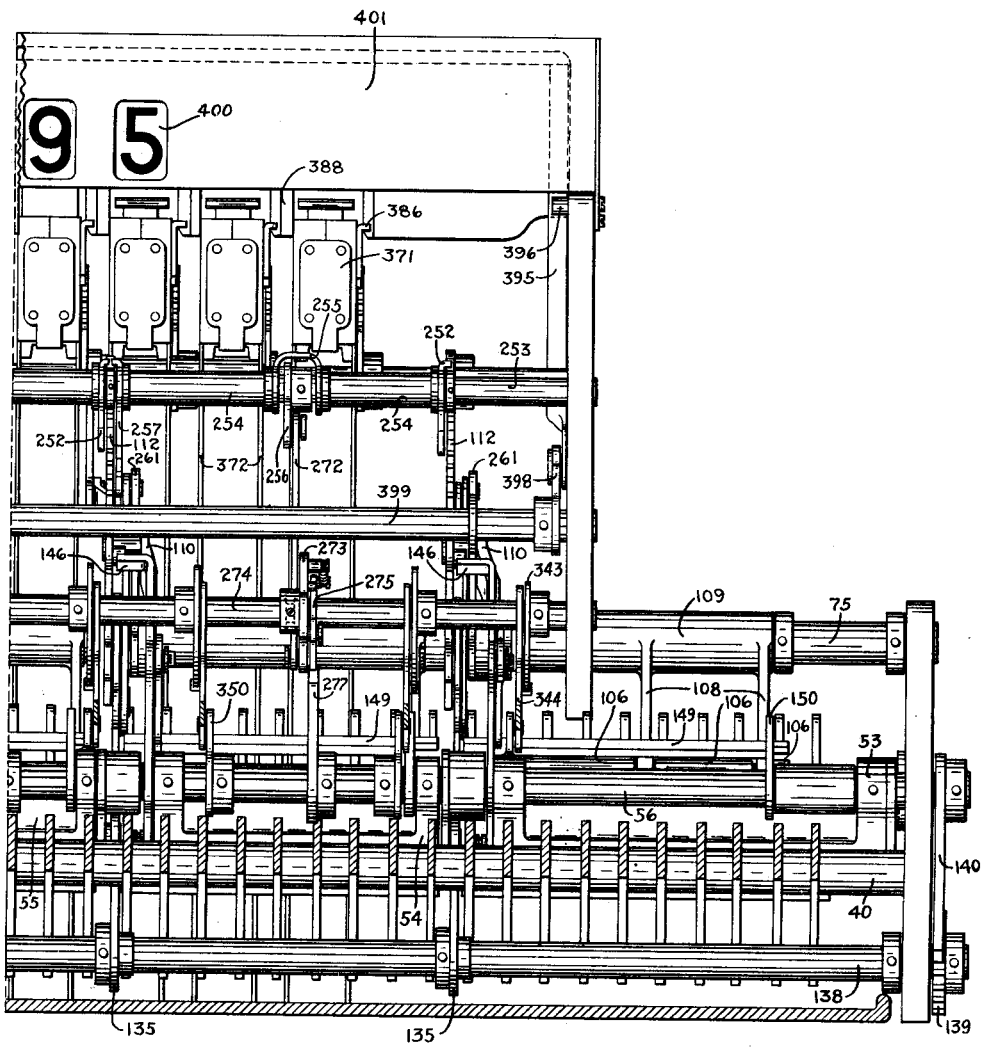

Figs. 24A and 24B taken together constitute a front elevational view of the machine with certain parts shown in section for clearness.

Figure 25:
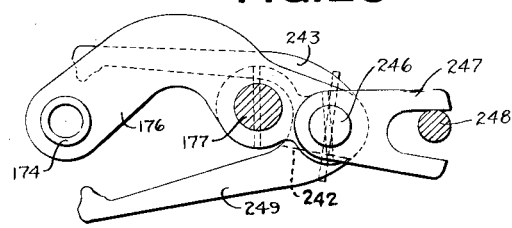

Fig. 25 is an enlarged detail view of the totalizer alining pawl operating mechanism.

Figure 26:
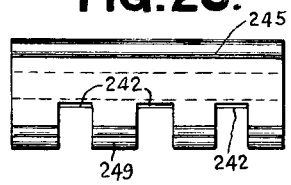

Fig. 26 is a front view of one of the totalizer aliners.

In general

Described in general terms, the machine includes a plurality of groups of amount lever keys, various transaction lever keys, and read and reset lever keys. There are a plurality of totalizers, one for each classification of transactions. These totalizers are operated by differential mechanism common to all totalizers, and under the control of manipulative means, which in this case are the amount keys.

The differential mechanism also provides means for adjusting type wheels to print on record material the amounts which are entered in the various transaction totalizers, and to print the totals accumulated on these totalizers.

The differential mechanism also adjusts the indicating mechanism to indicate the amount of each item recorded, and the totals accumulated on the various transaction totalizers.

The printing mechanism includes a single type line having type wheels equal in number to the number of totalizer wheels in a single totalizer, a type wheel having characters representing the various transactions, and a type wheel having characters indicating when a reading or resetting of the totalizers has been made. The other mechanism necessary in a printer is not shown as such mechanism does not enter into the invention.

A plurality of counting devices provide means for counting the number of various classified transactions.

Keyboard

Figure 1A:
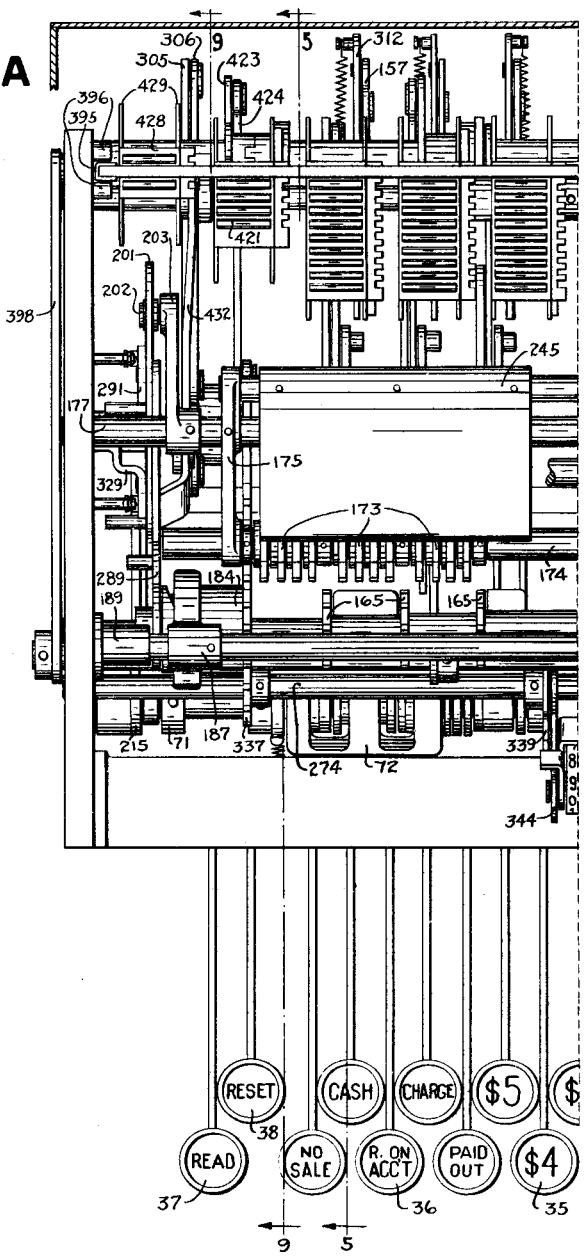
Figure 1B:
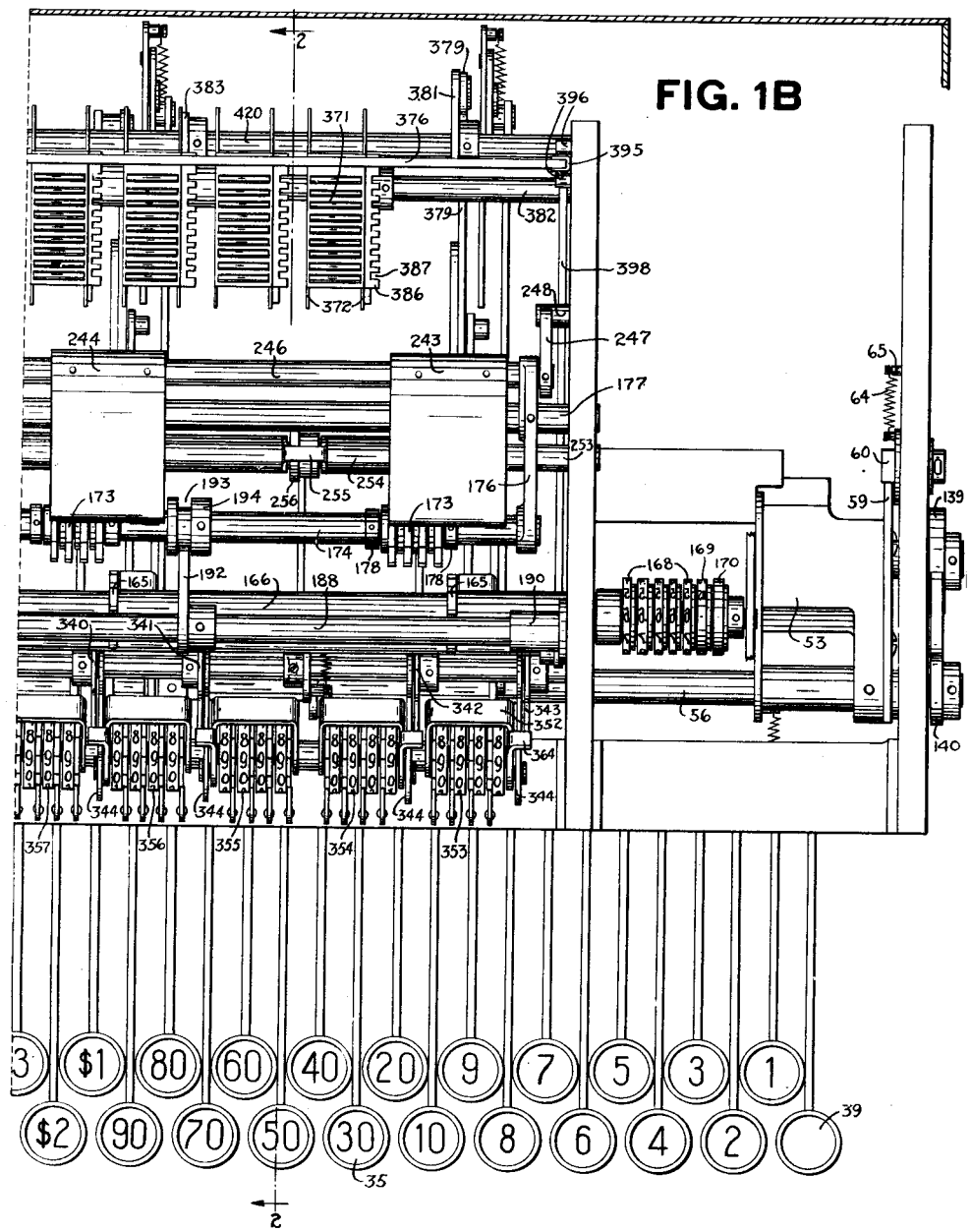

The keyboard consists of groups of amount keys 35 (Figs. 1A, 1B, 2 and 4), a group of transaction keys 36 (Figs. 1A, 5, and 8, a "read" key 37, a "reset" key 38 (Figs. 1A and 9) and a blank key 39 (Fig. 1B). These keys are pivoted upon a transverse rod 40 supported at each end in the side frames of the machine. The rear end 41 (Fig. 2) of each key normally rests upon a base 42. The keys are laterally spaced upon the rod 40 by slots in a casing 43 through which the forward ends of the keys project, and by a guide plate 44 having slots through which the rear ends 41 of the keys project. The plate 44 is supported at its lower end by the base 42 and at its upper end by a bar 45 supported by the side frames of the machine. The usual key stops 46 well known in this type of machine are used to prevent simultaneous operation of two or more keys of any one group.

Referring to Fig. 4 it may be seen that each group of amount keys 35 is provided with graduated openings 47 which are the means for differentially operating the totalizers, the printing wheels, and the indicating mechanism. The openings 47 formed in the keys 35 cooperate with a member of the differential mechanism which will hereinafter be described.

The usual lever key type of machine includes a single key coupler cooperating with all of the keys. In this machine the key coupler consists of a plurality of members, some of which are secured to a supporting shaft 56, while one member is pivoted on the shaft. The three key coupler members 53, 54 and 55 (Fig. 14) are for the three groups of amount keys and are secured to the shaft 56 supported in the side frames of the machine and move as a unit. Each of these key coupler members has a lip 57 (Fig. 2) resting upon the keys, and adapted to enter slots 58 in the keys as they are depressed. These key coupler members, 53, 54 and 55 constitute means for operating partially depressed keys of two or more groups, by fully depressing any one of said keys.

When a key is depressed and slightly raises the key coupler members so that lip 57 of the associated key coupler member enters the slot 58 in the key, a full-stroke device becomes effective to compel a complete operation of the key. This full-stroke device consists of a ratchet plate 59 (Figs. 1B, 13 and 14), secured to the right-hand end of the key coupler member 53. Cooperating with this ratchet plate is a retaining stud 60 freely mounted in the right-hand side frame of the machine and having its left-hand end formed to engage with teeth 61 of the ratchet plate 59. The stud 60 is held in its home position by a spring 64 stretched between a pin 63 in flange on said stud and a pin 65 in the frame of the machine.

A key coupler member 71 (Fig. 14) is also secured to the shaft 56 and cooperates with the "read" and "reset" keys, which are never simultaneously operated with the amount keys, but either one may be operated in connection with the transaction keys, which will be described hereinafter. A key coupler member 72 consisting of three arms joined together by a yoke 73 is pivoted on the shaft 56 to cooperate with the transaction keys which are operated in connection with the amount keys or with the "read" and "reset" keys, which will hereinafter be described.

The amount keys and the "read" and "reset" keys are locked against operation until one of the transaction keys has been depressed. This locking means includes an arm 74 pivoted on a shaft 75 (Fig. 9) and having a shoulder 76 formed on its lower end to engage the lip 57 on the key coupler member 71. This arm is connected by a yoke 77 to a companion arm 78 (Fig. 5) the front lower edge 79 of which is adapted to be engaged by a lip 80 on the key coupler member 72, so that as the key coupler member 72 is operated by a transaction key it will cause the arm 78 and its companion arm 74 to move in counter-clockwise direction, disengaging the shoulder 76 from the lip 57 of the key coupler member 71 (Fig. 9) thus permitting an amount key, the "read," or the "reset" key to be depressed.

The special transaction key that is depressed prior to the depression of an amount key or a "read" or "reset" key is retained in its depressed position until an amount key or a "read" or "reset" key is depressed, by latching the key coupler member 72 in its elevated position. This latching device consists of an arm 86 (Fig. 5) pivoted at a point 87 and normally pulled forward, by a spring 88, to its home position with a foot 89 resting upon the base 42. As the key coupler member 72 swings upwardly, the lip 80 will cause the arm 86 to move clockwise until the lip 80 passes above the upper end 90 of the arm 86, when the spring 88 will cause this arm to return to its home position, which will be with the end 90 under the lip 80 of the key coupler member 72. The operation of an amount key or "read" or "reset" key will cause this arm 86 to again swing in clockwise direction and allow the key coupler member 72 to return to its home position in unison with the other key coupler members. The releasing of this key coupler 72 is effected by the lip 57 on the key coupler member 71 engaging with an arm 91 which is also pivoted at the point 87 and fastened to the arm 86 by a hub 92, the upward movement of the key coupler member 71 causing both arms 91 and 86 to move clockwise.

Figure 9:
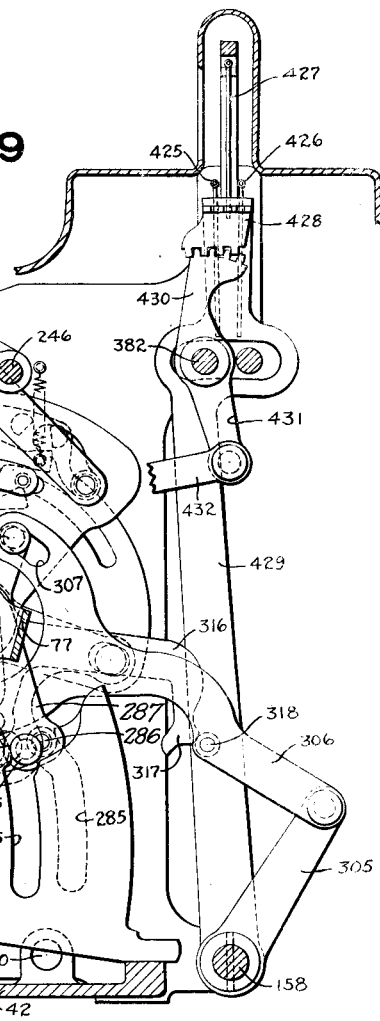
Fig. 9 is a transverse sectional view of the machine taken approximately on the line 9—9 of Fig. 1A, looking in the direction of the arrows.

As the key coupler member 72 is pivoted on the shaft 56 it is necessary to provide means for positively returning this key coupler member 72 from its operated position to its home position simultaneously with the return of the other key coupler members 53, 54, 55 and 71 from their operated positions to home positions. Placed intermediate of the key coupler member 71 and the key coupler member 72 (Fig. 14) is a latch 93 (Figs. 7, 9 and 14) having its front end bifurcated to engage the shaft 56 and permit a reciprocating movement of the latch. The latch 93 is provided with an elongated opening 94 receiving a guide pin 95 projecting laterally from the key coupler member 71. The latch has a downwardly projecting arm 96 which is normally held in contact with the rod 40 by a spring 97. As the key coupler member 71 swings counter-clockwise, the spring 97 will cause the latch 93 to move toward the shaft 56 to connect the key coupler members 71 and 72 together, as will be presently described, and, as the key coupler member 71 returns to its home position, the arm 96, by contacting the rod 40, will return the latch 93 to its home position, as shown in Fig. 9 to disconnect the key coupler members.

Formed in the rear end of the latch 93 is a curved slot 98 having a right angle extension at its lower end. Adapted to move in the slot 98 is a pin 99 projecting laterally from the left-hand arm of the key coupler member 72. As a transaction key is depressed the pin 99 will pass upwardly through the curved slot 98, and as the latch 93 is moved counter-clockwise, by the key coupler member 71, the spring 97 will draw the latch 93 toward the shaft 56 as the lower end of the slot 98 reaches the pin 99. This will place a shoulder 100 on the latch 93, over the pin 99, to connect the key coupler members 71 and 72 so that the return movement of the key coupler member 71 will positively return the key coupler member 72. As the arm 96 on the latch 93 again contacts the rod 40 the latch 93 will be moved to its normal position to disconnect the key coupler members.

*Differential mechanism*

Figure 22:
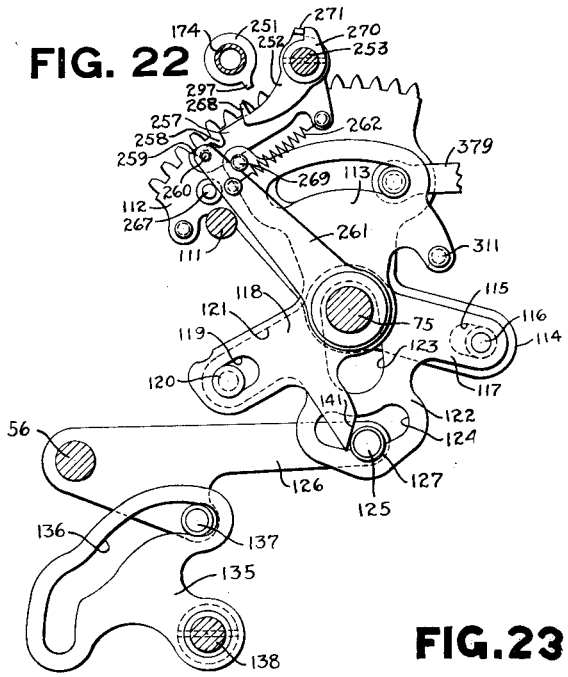
Fig. 22 is a detail view of the totalizer actuating and transfer mechanisms in their home positions.
Figure 23:
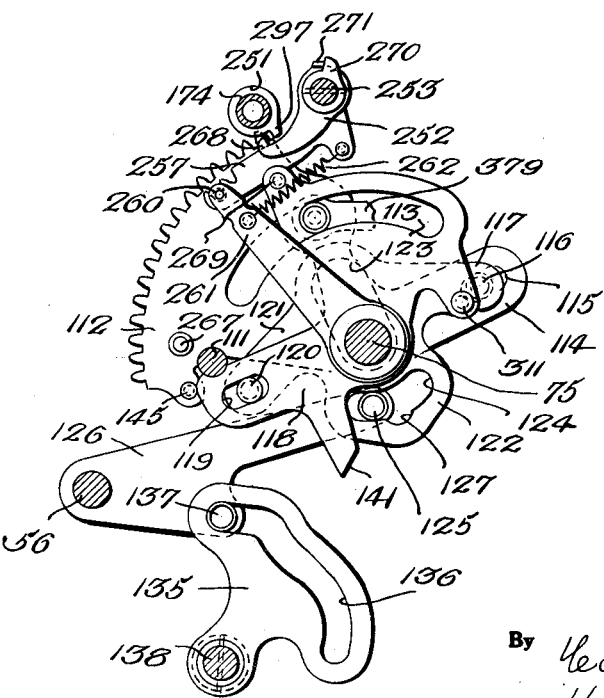
Fig. 23 is a detail view of the totalizer actuating mechanism in the ninth position, and the transfer mechanism in normal position.

The differential mechanism operated from the amount keys controls the movement of the totalizer wheels, the positioning of type wheels, and the selection of the indicators. The sides of the graduated openings 47 in the keys 35 (Figs. 2 and 4) engage a roller 106 freely mounted on a rod 107 supported in arms 108 extending downwardly from a sleeve 109 freely mounted upon the shaft 75 (Figs. 2 and 24B). There is a sleeve 109, with its downwardly projecting arms 108 and roller 106 provided for each denominational group of amount keys. Integral with one of the arms 108 is an arm 110 (Fig. 2) provided with a laterally projecting stud 111 which extends into the plane of a gear segment 112. The arm 110 carrying the stud 111 is differentially positioned by the openings 47 in the keys 35 to control the counter-clockwise movement of the gear segment 112. The gear segment 112, which is the actuating means for the totalizers and the type wheels, is pivoted on the shaft 75 together with a companion lever 113 having an arm 118 (Figs. 2, 22 and 23). The gear segment 112 and the arm 118 of the plate 113 move toward each other during their operations until each is stopped by contacting the differentially positioned stud 111 on the differentially adjustable arm 110.

The gear segment 112 has an arm 114 (Figs. 2 and 22) having a slot 115 into which projects a pin 116 carried by an arm 117. This arm 117 is rigid with an operating plate 122 having a substantially vertically arranged slot 123, so that the plate 122 surrounds the shaft 75 and may be moved vertically relatively to the shaft 75. The arm 118 of the lever 113 has a slot 119 into which projects a pin 120 carried by an arm 121 also rigid with the operating plate 122.

From the connections just described, it will be clear that when the operating plate 122 is moved upwardly (Figs. 2 and 22), by means to be hereinafter described, the arm 117 of the plate 122, through the pin and slot 116, 115 and arm 114, will drive the segment 112 in counter-clockwise direction. Simultaneously with this counter-clockwise movement of the segment 112, the arm 121 of the operating plate 122, through the pin and slot 120, 119, drives the arm 118 of the lever 113 clockwise. These two movements continue until either the arm 118 or segment 112 contacts the differentially positioned stud 111.

When either the gear segment 112 or the arm 118 of the lever 113, is arrested, the other one of the two moves on until it also is arrested by the stud 111.

The operating plate 122 has a curved slot 124 into which projects a roller 125 on an arm 126 pivoted on the shaft 56. The roller 125 normally rests in an offset 127 of the slot 124. There is, of course, an operating plate 122 and an arm 126 for each of the denominational groups of keys of the keyboard. The arms 126 are oscillated by a series of cam levers 135 (Fig. 16). The cam levers 135 have slots 136 arranged in timed succession and engage rollers 137 on the arms 126. The cam levers 135 give the arms 126 a fixed movement during each operation of the machine, and the arms 126, in turn, give the operating plates 122 fixed sliding movements during each operation of the machine. The cam levers 135 are all secured to a shaft 138 supported at each end in the machine side frames. Also secured to the shaft 138 outside of the right-hand side frame of the machine (Fig. 24B), is a partial gear 139 (see also Fig. 15), meshing with a segment 140 secured to the key coupler shaft 56. As the key coupler operates, the arm 138 is oscillated through the segment 140 and partial gear 139, and consequently, the cam levers 135 are oscillated to rock the arms 126 first counter-clockwise (Figs. 2 and 22), and then clockwise to their normal positions. As the arms 126 move counter-clockwise their rollers engage the upper walls of the slot 124 and move the operating plates 122 upwardly to rock the gear segments 112 and levers 113 as previously mentioned.

As the operating plate 122 is raised to rotate the gear segment 112 and lever 113, this plate 122, due to its connection with the segment gear 112 and the arm 118 of the lever 113, also rotates. The slots 115, 119, however, are of sufficient length to provide for the relative sliding and rocking movements of the driving plate 122, gear segment 112, and lever 113.

Assuming now that the "9" amount key has been depressed, and referring particularly to Figs. 2, 22 and 23, Fig. 2 shows the parts in their home positions; Figs. 22 and 23 show the differential mechanism in the home and "9" positions respectively. During an operation with the "9" key depressed, the differential arm 110 and its stud 111 are moved from the position shown in Figs. 2 and 22, nine steps, so that the stud 111 assumes the position shown in Fig. 23.

As the arm 126 rocks counter-clockwise (Fig. 2) the roller 125, by its contact with a toe 141 of the arm 118, rocks said arm counter-clockwise until the roller 125 strikes the upper wall of the slot 124 of the operating plate 122. Continued upward movement of the roller 125 now raises the operating plate 122, and continues to rock the arm 118 clockwise until the arm is stopped by the stud 111 which has been moved to the "9" position. During this time, the segment 112 and arm 114 have been slightly rocked in a counter-clockwise direction through the pin 116 and arm 114.

Now as the arm 118 has been stopped by the stud 111, the continued pressure of the roller 125 against the upper wall of the slot 124 continues to slide the operating plate 122 upwardly, and at the same time causes the plate 122 to rock counter-clockwise with the pin 120 as the fulcrum, and the pin 116 rocks the arm 114 and segment 112 counter-clockwise until the latter contacts the stud 111.

The extra movement of the arm 118, by roller 125 contacting the toe 141, moves the stud 269 on the lever 113 away from the arm 261 for a purpose to be hereinafter described in connection with the transfer mechanism. During this movement the operating plate 122 is rocked counter-clockwise until the roller 125 assumes a position near the left-hand end of the slot 124.

While the segment 112 is in this position, the selected totalizer, in a manner to be hereinafter described, is rocked into engagement with the differentially positioned actuator segment 112. After this engagement has been effected, the arm 126, by its cam lever 135, is moved clockwise to its normal position. During this restoring movement the roller 125 strikes the bottom wall of the slot 124 of the operating plate 122, thus sliding the plate downwardly and at the same time causing it to rock clockwise to its home position, thus driving the actuating segment 112 clockwise and adding into the totalizer pinion "9," which is equal to the nine steps of movement given the segment at this time. After the segment 112 has been restored to its normal position, the latter part of the movement of the arm 126 and roller 125 through the operating plate 122, restores the arm 118 and its lever 113 in counter-clockwise direction to their home positions.

The clockwise movement of the segment 112 is limited by a pin 267 carried thereby, contacting a control arm 261 normally in the position shown in the Figs. 2 and 22. This arm 261 is controlled by transfer mechanism to be later described. But, when no transfer has taken place, the arm 261 remains locked in the position shown in Figs. 2 and 22, thus positively limiting the clockwise movement of the actuating segment 112.

As another illustration of the differential adjusting of the actuating segment 112 and lever 113, let it be assumed that the "3" key is depressed. Depression of this key moves the differential arm 110 (Fig. 2) three steps in counter-clockwise direction, thus positioning the stud 111 three steps away from the segment 112. Now, when the arm 126 is rocked counter-clockwise, the operating plate 122 is moved upwardly and the pin 116 rocks the segment 112 counter-clockwise, and the pin 120 rocks the lever 113 clockwise. The stud 111 having been positioned nearer the segment 112 than the arm 118, the segment 112, of course, contacts the stud 111 first, and then the continued pressure of the roller 125 against the upper part of the slot 124 in the operating plate 122 causes said plate to rock clockwise, thus moving the arm 118 and lever 113 clockwise until the arm 118 strikes the stud 111. The first movement of the roller 125 slightly rocks the arm 118 clockwise due to the contact of the roller with the toe 141 of the arm 118.

The segment 112 has now been set in the "3" position, and the selected totalizer is moved into engagement therewith, after which the arm 126 restores the operating plate 122 to its normal position, thus rocking the segment 112 clockwise three steps, which adds "3" into the selected and engaged totalizer. The lever 113 is, of course, rocked counter-clockwise to its normal position by the downward movement of the operating plate. As the roller 125 nears its home position it will, by its contact with the toe 141, retard the counter-clockwise movement of the lever 113 for a purpose to be hereinafter described in connection with the transfer mechanism.

When there is no key 35 depressed, an arm 147 (Fig. 2), cooperating with a stud 145 on the segment 112 holds the segment 112 against movement. Such a holding means is necessary since, when no key 35 is depressed no slot 47 embraces the universal roller 106, and the arm 110 and the stud 111 are free, and therefore, they cannot control the adjustment of the segment 112 during such an operation the counter-clockwise movement of the arm 126 and its roller 125 drives the operating plate 122 upwardly, and since the segment 112 cannot move, the pin 116 then becomes the fulcrum for the plate 122 as it is being raised, and the arm 118 and the lever 113 are rocked clockwise until the arm 118 contacts the stud 111. This movement of the lever 113 controls the setting of the "0" indicator in a manner to be hereinafter described, during such an operation when no amount key has been depressed. The return movement of the arm 126 clockwise to its normal position, through the roller 125 and operating plate 122, rocks the arm 118 and lever 113 counter-clockwise to the position shown in Fig. 2.

From the above description it can be seen that the operating plate 122 has fixed up and down movements and an oscillatory movement, but the extent of the oscillatory movement is determined by the value of the key 35 which is depressed.

Referring to Fig. 2 it may be seen that the segment 112 is normally locked against movement by the arm 147 contacting a stud 145 on the segment 112, unless a key 35 related to that particular segment is operated. This locking means consists of the pin 145 projecting from the segment 112 and engaging the flange 146 formed on the arm 147 pivoted on the shaft 56. This arm has a rearwardly extending arm 148 which is connected by a yoke 149 to a companion arm 150 (Fig. 24B) also pivoted on the shaft 56. As an amount key is depressed, a projection 151 (Figs. 2 and 4) on the key will engage the flange 149 and cause the arm 147 to move in a counter-clockwise direction so that the flange 146 will be out of the path of the pin 145, in which position the gear segment 112 will be allowed to move counter-clockwise; but should there be no key depressed in any particular group, the gear segment of that differential unit will remain in its home position, and its companion lever 113 will be caused to move the full ten divisions of movement, as heretofore described. As the depressed amount key returns to its home position, as shown in Fig. 2, a spring 152, which is attached to the arm 147, will return this arm to its home position.

When the arm 147 is in its home position, a pin 153 mounted in this arm is in engagement with the right-hand end of a slot 154 formed in a link 155 pivoted at a point 156 to an arm 157, secured to a shaft 158 supported in the frame of the machine. The link 155 also functions in connection with the "read" or "reset" operation of the machine, which will hereinafter be described.

*Printing mechanism*

As any of the well known printing mechanisms used on lever key type machines can be used in this machine, only so much of the printing mechanism is shown and described here as is necessary to disclose the means for positioning the type wheels from the differential mechanism.

In mesh with each actuating gear segment 112 (Fig. 2) is a pinion 165 secured to the left-hand end of one of the telescopic sleeves 166 which surround a shaft 167 supported in the frame of the machine. Securely mounted on the right-hand end of these sleeves are five amount type wheels 168 (Fig. 1B). A character wheel 169, positioned to the right of the amount type wheels, represents the various transaction keys 36 and is adjusted by differential mechanism hereinafter to be described. To the right of the transaction type wheel, is another type wheel 170 having characters representing the "read" and "reset" keys 37 and 38 respectively, and operated from these keys by means which will hereinafter be described.

*Accumulating mechanism*

The machine, as illustrated herein, is provided with four transaction totalizers, one each for classifications known herein as "Cash", "Received-on-account", "Charge", and "Paid out". Each totalizer includes five denominational elements 173 (Figs. 1A, 1B, 2 and 5), and since there are three banks of keys, the three lower denominational elements receive the entries direct from the differential segments 112 and the two higher denominational elements 173 are used for overflow amounts. The elements of each denomination are arranged in groups, the first group from the right includes the four "cents" elements; the second group includes the four "dimes" elements; the third group includes the four "dollars" elements; the fourth group includes the four "tens of dollars" elements; and the fifth group includes the "hundreds of dollars" element, as is common in interspersed totalizers of the type shown and described in the patent to Fuller, No. 1,242,170, thus making five groups of denominational elements and four elements in each group, which are shifted laterally for the selection of a totalizer, as is well known in the art.

The totalizer wheels 173 are rotatably mounted on a hollow shaft 174 supported near its ends by arms 175 and 176, pinned to a shaft 177 supported at each end in the frame of the machine. Each group of wheels is maintained in its relative lateral position on the shaft 174 by collars 178 which are placed one on each side of the group of wheels and pinned to the shaft 174. The shaft 174, together with its various groups of totalizer wheels, is adapted to be moved laterally so as to position the appropriate totalizer wheels in the plane of the actuating gear segments 112.

The positioning of the totalizer wheels in actuating position is controlled by the five transaction keys 36. Referring to Fig. 8, which shows the rear portions of the various transaction keys, it may be seen that these keys, like the amount keys, are provided with graduated openings 179 adapted to engage rollers 180 (Fig. 5) mounted on five separate arms 181 pinned to the shaft 75. A gear segment 182, also pinned to the shaft 75, will be thus moved differentially by the transaction keys. The gear segment 182 is constantly in mesh with a pinion 183, secured to a drum cam 184 (Figs. 1A and 5) fastened to the sleeve 185 near its left-hand end the right-hand end of the sleeve having the type wheel 169 secured thereto. Engaging the drum cam 184 is a roller 186 carried by one arm 187 of a forked member pinned to a shaft 188 supported in two sleeves 189 and 190 secured to the frame of the machine. The rear arm 191 (Fig. 5) of the forked member cooperates with the roller 186 in preventing oscillating movement of the shaft 188. Pinned to the shaft 188 is an arm 192 (Figs. 1B and 2) which enters a groove 193 formed in a collar 194 pinned to the shaft 174. As the drum cam 184 oscillates it through the shaft 188, arm 192 and collar 194, will move the shaft 174 transversely of the machine.

Figure 11:
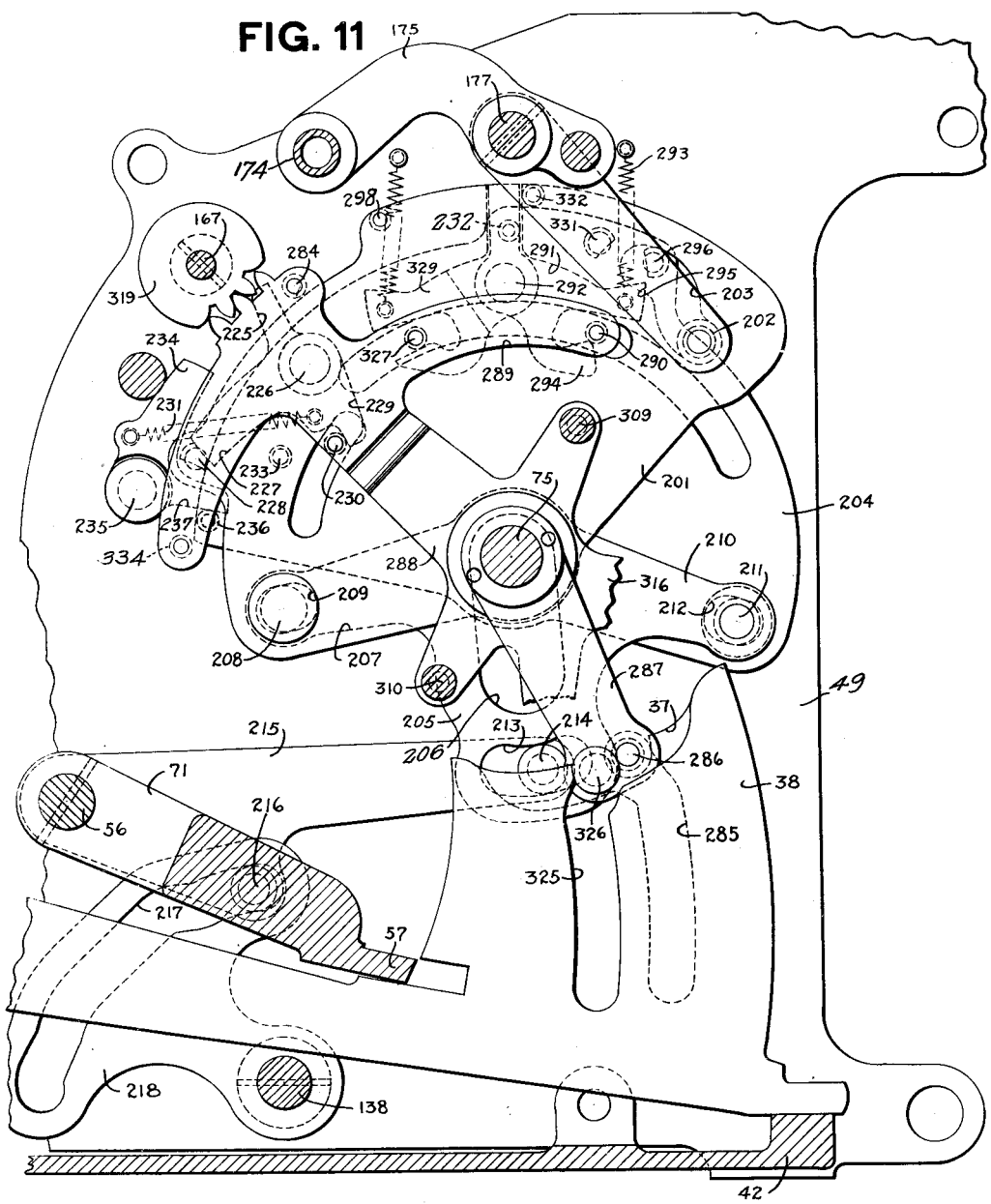
Fig. 11 is an enlarged elevational view of the mechanism for controlling the engagement of the totalizers with their actuating segments for the various operations of the machine.
Figure 17:
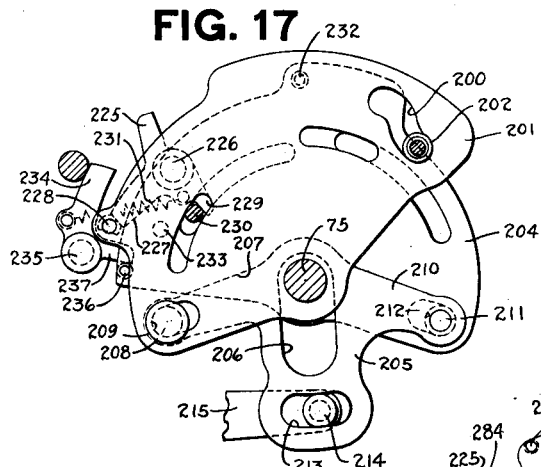
Fig. 17 is a detail view of the totalizer engaging mechanism for adding operations.
Figure 21:
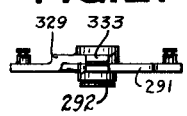
Fig. 21 is a top plan view of the pawls shown in Fig. 20.

After a particular totalizer corresponding to the transaction key depressed, is moved into position to engage the actuating gear segments 112 (Fig. 2), the shaft 177, upon which the totalizer arms 175 and 176 are secured, is moved in a counter-clockwise direction to engage the totalizer wheels with the actuating segments. This shaft is oscillated by a cam slot 200 (Fig. 17) formed in a plate 201. Cooperating with the cam slot 200 is a roller 202 carried on an arm 203 (Fig. 11) pinned to the shaft 177. The plate 201 is freely mounted upon the shaft 75 and, during an operation of the machine, is caused to move first clockwise to engage totalizers with the actuating segments, and then counter-clockwise to disengage the totalizers from the actuating segments. Associated with this plate 201 is a plate 204 which is also freely mounted upon the shaft 75 and moves first counter-clockwise then clockwise. Intermediate the two plates is driver 205 which has an elongated opening 206 surrounding the shaft 75. This driver has an arm 207 carrying a roller 208 cooperating with an elongated opening 209 in the plate 201. A second arm 210 carries a roller 211 engaging an elongated opening 212 formed in the plate 204. In the lower part of the driver 205 is a curved slot 213 into which is entered a roller 214 carried by an arm 215 pivoted upon the shaft 56 (Figs. 11 and 14). The arm 215 carries a second roller 216 engaging a cam slot 217 (Fig. 11) of a cam lever 218 pinned to the shaft 138. As this shaft oscillates, the arm 215 (Figs. 11 and 17) will move counter-clockwise and move the driver 205 upwardly and, by its connections to the plates 201 and 204, cause these plates to move in opposite directions about the shaft 75.

In an operation of the machine in which an amount is added into the totalizer, the plate 201 is held against movement until near the end of the downward movement of the lever keys, when it is released and permitted to move clockwise so that the cam slot 200 and its associated parts will engage the totalizer with the actuating gear segments 112. The plate 201 is held against movement during the time stated above by a pawl 225 pivoted on a stud 226 supported in the frame of the machine. An arm 227 on the pawl 225 normally engages a pin 228 secured in the plate 201. The pawl has a second arm 229 which normally is held in engagement with a pin 230 by a spring 231. The plate 204 carries a pin 298 which, as this plate moves counter-clockwise, will engage the pawl 225 and rock it counter-clockwise thus disengaging the arm 227 from the pin 228. The pawl 225 will move until its arm 227 engages a pin 233 on the side frame of the machine. The arm 227 being disengaged, and the pin 232 engaging the pawl 225, will cause the plate 204 to stop and permit the plate 201 to move. When the plate 201 reaches the limit of its clockwise movement a spring-pulled pawl 234 will move on its pivot 235 in a clockwise direction a distance sufficient to place the upper end of the pawl in the plane of a flat side of the pin 228, carried by the plate 201. With the pawl 234 in this position, the plate 201 will be retained in its operated position, thereby keeping the totalizer in engagement with the actuating segments during the greater part of the return movement of the operated lever keys. As the plate 201 will be held against movement during the time stated above, it will be necessary for the plate 204 to return to its home position ahead of the plate 201, and, as the plate 204 returns to its home position, a pin 236 carried by this plate will engage an arm 237 of the pawl 234 and return the pawl to its home position, releasing the plate 201 so that it can return to its home position and disengage the totalizers from the actuators.

The five groups of totalizer wheels 173 (Figs. 1A. 1B and 2) are normally held in alinement by three aliners 243, 244 and 245, pinned to a shaft 246 supported at its ends by the arms 175 and 176. Secured to the right-hand end of the shaft 246 is a bifurcated arm 247 (Figs. 1B and 25) which straddles a pin 248 projecting laterally from the frame of the machine. In normal position, this arm rests on the top of the pin 248 with a clearance between the bottom of the pin and the lower part of the arm. The clearance between the pin and the arm permits the aliners to remain in engagement with the totalizer wheels until they become partially engaged with the actuating segments 112 when the lower part of the arm will engage the pin 248 and cause the aliners to disengage from the totalizers as they continue their movement into engagement with the actuating segments. Each of the aliners 243, 244 and 245 has a companion aliner 249 rigid therewith and which lies under the aliners 243, 244 and 245 so as to engage the under side of the totalizers, as they move into engagement with the actuating segments. The purpose of the aliners 249 is to lock all elements of the totalizers against rotation, excepting the totalizer wheels that happen to be in the plane of the actuating segments. The alining members 249 are slotted as at 242 (Figs. 2, 5 and 26) to permit the actuating segments and parts of the transfer mechanism to properly perform their functions.

Referring to Fig. 22 it may be seen that a number of gear teeth in the actuating segments 112 are pointed. This is to facilitate the engaging of the totalizer wheels 173 (Fig. 2) with the actuating segments, the teeth of which are also pointed. After the totalizer wheels are in engagement with the actuating segments, they are caused to rotate to extents corresponding to the amount keys operated.

Each gear wheel 250 has attached thereto a transfer trip cam 251 (Figs. 22 and 23). The transfer trip cam that is in position to be actuated will lie in the plane of a trip pawl 252 pivoted on a shaft 253 supported in the frame of the machine.

Each trip pawl 252 is supported by a hub 254 (Figs. 24A and 24B). The right-hand hub of the group is arranged in two sections which are joined together by a yoke 255 to permit a transfer restoring arm 256 (Figs. 3 and 24B) to be secured to the shaft 253 at that particular point. Secured to the left-hand end of each of the hubs is an arm 257 (Figs. 22, 23, 24A and 24B). The forward end of this arm is provided with two notches 258 and 259 (Fig. 22) which are adapted to be engaged by a pin 260 mounted in an arm 261 pivoted on the shaft 75. A spring 262, attached to the arms 257 and 261, will keep either the notch 258 or the notch 259 in engagement with the pin 260. With the pin 260 in engagement with the notch 259, as shown in Fig. 22, the actuating segment 112 will be caused to stop in its home position, when moving in a clockwise direction during an operation of the machine, by a pin 267 mounted in the segment 112 contacting the arm 261. When a transfer takes place from a wheel of lower order to a wheel of higher order, the trip cam 251 of the lower order moving counter-clockwise will contact a nose 268 on the pawl 252 and rock the pawl counter-clockwise, thus lowering the arm 257 so that the spring 262 will move the arm 261 clockwise into a position to engage the notch 258 of the arm 257 with the pin 260, in which position the actuating segment 112 for the wheel of higher order will be permitted to move one step farther in a clockwise direction before being stopped by its pin 267 contacting the arm 261, and cause a transfer to this wheel. A pin 269 mounted in the lever 113 (Fig. 22) normally engaging the right-hand edge of the control arm 261, is held out of contact with this arm, while the transferring from lower to higher order takes place, by the roller 125 which contacts the toe 141 of the arm 118 just before the roller 125 reaches its normal position, which is just at the time the transfer pawl 252 is being tripped. Just before the roller 125 reaches its home position, and after the transfer has been turned in, the roller 125 contacts the edge of the toe 141 to which the reference numeral has been applied, thus permitting the operating plate 122 during the very last stage of its downward movement to rock the lever 113 counter-clockwise to its final home position through the stud 120 and slot 119 in the arm 118. The object of holding the stud 269 away from the arm 261, is to permit a free movement of the arm 261 by the spring 262 as above described, when the arm 257 is rocked counter-clockwise by the tripping of the pawl 252 under control of the transfer projection 297 on the totalizer. If the stud 269 on the lever 113 was permitted to remain in contact with the arm 261, the spring 262 would then have to move, not only the arm 261 in clockwise direction, but also the lever 113. By retarding the movement of the lever 113 by contact of the roller 125 with the toe 141 just at the time the transfer pawl 252 is tripped, the load of the lever 113 is taken off the spring 262, thus providing a more efficient transfer device.

Near the end of the operation of the machine, and just before the arm 126 and roller 125 move to their normal positions, the shaft 253 is rocked counter-clockwise, by means to be later described, to lower the arm 257, so that when the roller 125 through the operating plate 122, finally restores the arm 118 and lever 113 to their normal positions, the pin 269 by its contact with the control arm 261, returns said arm to its normal position, after which the shaft 253 rocks clockwise to its normal position, thus causing the notch 259 to engage the stud 260 and lock the control arm in the position shown in Fig. 22.

The means for rocking the shaft 253 will now be described. Pinned to the shaft 253 are a plurality of arms 270 (Fig. 22) which engage ears 271 formed on the pawls 252. The arm 256 (Fig. 3) which is secured to the shaft 253, is connected by a link 272 to a lever 273 pivoted on a rod 274 supported in the frames of the machine. This lever carries a spring actuated pawl 275 which is pivoted at the point 276, the lower end of the pawl being adapted to engage an arm 277 pinned to the key coupler shaft 56. As the key coupler shaft moves counter-clockwise, the arm 277 will engage the pawl 275 and move this pawl on its pivot against the tension of a spring 278. As the key coupler shaft returns to its home position, the arm 277 will again engage the pawl 275 and cause the lever 273 to swing counter-clockwise on its pivot, thereby rocking the shaft 253 and restoring the transfer mechanism. The pawl 275 normally rests against a pin 279 mounted in the lever 273.

Totalizer reading mechanism

The amount accumulated on the various totalizers may be ascertained by the aid of the type wheels, which are automatically positioned when the machine is operated by depressing one of the transaction keys and the "read" key 37.

Figure 20:
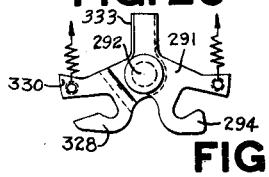
Fig. 20 is a detail view of pawls shown in Figs. 18 and 19.
Figure 18:
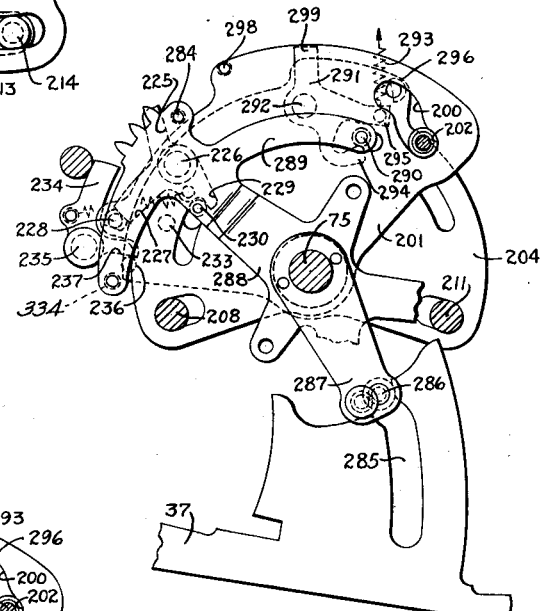
Fig. 18 is a detail view of the totalizer engaging mechanism for reading operations.
Figure 19:
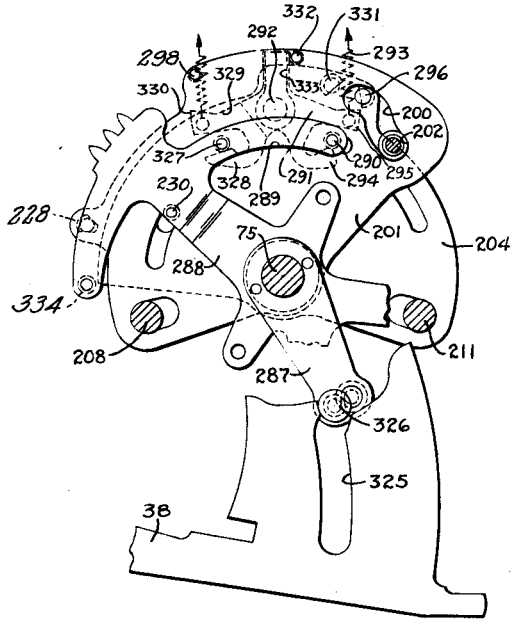
Fig. 19 is a detail view of the totalizer engaging mechanism for a resetting operation.

The "read" key 37 (Figs. 11 and 18) has a cam slot 285 formed in its rear end which, as the key is operated, will engage a roller 286 carried in an arm 287 pivoted on the shaft 75 and pinned to a plate 288. As the roller 286 moves in the slot 285, the plate 288 will be given a slight movement counter-clockwise. This plate has a projecting arm 289 which carries a pin 290 projecting through an opening in the plate 201 to engage with a pawl 291 which is pivoted upon the stud 292, supported in the side frame (Figs. 18 and 20). A spring 293 normally holds a projection 294 of the pawl 291 in engagement with the pin 290 and as the pin 290 moves toward the left with the arm 289, the spring 293 will move the pawl 291 counter-clockwise on its pivot, placing a shoulder 295 of the pawl 291 in the path of the flat sided pin 296 projecting laterally from the plate 204 and prevent this plate from moving while the pawl is in this position. With the plate 204 retained in home position the plate 201 will be moved in a clockwise direction by the driver 205 (Fig. 17) being operated by the arm 215, as previously described, which will cause the totalizers to be engaged with the actuating segments through the cam slot 200.

Referring to Fig. 18 it can be seen that the plate 201 is normally retained against operation in a clockwise direction by the arm 227 engaging the pin 228 mounted in the plate 201, but as the plate 288 is moved counter-clockwise by the "read" key 37, a pin 284 carried in this plate will engage the pawl 225 to swing it on its pivot which releases the plate 201 for operation, thereby engaging the totalizer wheels with the actuating segments 112 (Fig. 2) at the beginning of the operation of the machine. These segments 112 will move counter-clockwise under the control of the totalizer wheels, the transfer cams 251 (Figs. 22 and 23) each having a projection 297 which, as the wheels rotate clockwise, will engage the nose 268 on the pawl 252 and stop rotation of the wheel and the segment gear 112. During this movement of the actuating segment 112 the type wheels are positioned through the pinions 165 and sleeves 166 to set up an amount corresponding to the amount accumulated in the totalizer. After the actuating segment 112 has been stopped by the projection 297 on the transfer cam (Fig. 22) engaging the nose 268 on the pawl 252, the lever 113 (Fig. 2) of the differential mechanism will move, as has previously been described, in connection with the entering of items in a totalizer.

In setting up the type wheels to read the accumulated amount on a totalizer, the wheels of this totalizer are turned to their zero positions. Therefore the totalizer remains in engagement with the actuating segments until the segments are again restored to their home positions. To accomplish these results the plate 201 (Fig. 18) must be retained in its operated position during the time it takes to position the type wheels, and then restore them to their normal positions. As the plate 201 (Figs. 11 and 17 to 19) reaches the limit of its clockwise movement, upon depression of the "read" key 37, (Fig. 1A) a stud 298 on the plate 201 wipes against an upwardly extending finger 299 on the pawl 295, to rock said pawl clockwise to free the plate 204. Upon continued operation of the "read" key, the plate 204 starts to move counter-clockwise. As the plate 204 moves counter-clockwise a stud 236 thereon moves away from the finger 237 of the pawl 234, whereupon the spring 231 moves the end of the pawl 234 beneath the stud 228, which at that time is in its extreme clockwise position, to temporarily maintain the plate 201 in its operated position. The clockwise movement of the plate 201, through the cam slot 200, roller 202, and arm 203, rocks the selected totalizer into engagement with the actuators 112, and as long as the plate 201 is held in such moved position by the pawl 234, the totalizer remains in engagement with its actuators.

Return movement of the "read" key 37, and the key coupler 57, through shaft 56 (Fig. 15), segment 140, and the gear 139, returns the shaft 138, cam 218 (Fig. 11), and arm 215 (see also Fig. 17) toward their normal positions, to lower the driver 205 to its normal position. Since the plate 201 is temporarily held against return movement by pawl 234, when the return movement of the driver starts, the plate 204 is rotated clockwise by the stud 211, until the stud 236 strikes the finger 237 of the pawl 234, and withdraws the pawl from contact with the stud 228 to release the plate 201. At the end of the clockwise movement of the plate 204, the stud 296 is again in position to be latched by the pawl 291, but at this time the stud 298 still holds the pawl 291 against the tension of the spring 293. Continued movement of the driver 205 toward its normal position rotates the plate 201, now released, counter-clockwise, and withdraws the stud 298 from contact with the finger 299, to permit the pawl 291 to snap behind the stud 296 to again lock the plate 204. As the "read" key reaches its normal position, the cam slot 285 therein restores the arm 287 and the plate 288 to their normal positions, to withdraw the pawl 291 from contact with the stud 296 on the plate 204 and to permit the pawl 227 to again engage the stud 228 on the plate 201, preparatory to another operation of the machine.

Referring to Fig. 2 it will be seen that the actuating segments 112 are normally locked against operation by the arm 147, and when entering items in the totalizers this lock is removed by the operation of any amount keys, which has been previously described. In a "read" operation of the machine the amount keys are not depressed, and therefore other means are supplied to unlock this lock, so that the actuating segments may operate.

The link 155 (Fig. 2) which forms a connection between the arm 147 and the arm 157 secured to the shaft 158 will move the arm 147 counter-clockwise to release the actuating segments so that they may operate. The shaft 158 is oscillated by means of an arm 305 (Fig. 9) pinned to the shaft and connected at its upper end by a pitman 306 to the plate 288 (Figs. 9 and 18). The forward or left-hand end of this pitman is bifurcated and has two elongated slots 307 and 308 engaging studs 309 and 310, respectively, mounted in the plate 288.

The shaft 158 serves a double purpose. In addition to releasing the actuating segment for operation, it also causes a retarding action on the lever 113 (Fig. 2) so that the actuating segment 112 will move prior to the lever 113 and under the control of the totalizer. This retarding effect on the lever 113 is obtained by a pin 311 carried in the lever 113 and adapted to cooperate with a lever 312 pivoted at 313 on the arm 157. This lever in normal position is held in engagement with a pin 314 by a spring 315. As the shaft 158 rocks counter-clockwise, the lever 312 will pass under the pin 311 so that when the lever 113 tends to move clockwise, its pin 311, engaging the lever 312, will increase the tension upon the spring 315 and place a retarding effect upon the lever 113; but, as the actuating segment 112 is positively stopped by the transfer cam 251 previously described, the lever 113 will be caused to move against the tension of the spring 315.

The shaft 158 (Fig. 9) is locked against operation, unless the "read" or "reset" key is depressed. This locking means consists of a rearwardly extending arm 316 on the plate 288 (Fig. 9) provided with an irregularly formed end 317 which engages a pin 318 mounted in the pitman 306. The moving of the plate 288 clockwise and counter-clockwise by the "read" and "reset" keys in the manner to be hereinafter described, will destroy the locking condition between the end 317 of the arm 316 and the pin 318 carried on the pitman 306. The reset key 38 through a roller 326 on the arm 287 and a slot 325 in the key 38 (Figs. 9 and 11) rocks the arm 287 clockwise, and as this arm is connected to the plate 288, the plate 288 and arm 316 are rocked clockwise, thus removing the projection on the end 317 of the arm from in front of the pin 318. The plate 288 carries the stud 310, which, it will be remembered, projects through the slot 308 in the pitman 306. There is a clearance between the left end of the slot 308 and the stud 310, as clearly shown in Fig. 9, which clearance is sufficient to allow the movement of the plate 288 and arm 316 to remove the projection on the lower end 317 of the arm 316 from in front of the pin 318. After the projection on the end 317 passes from in front of the pin 318, the stud 310 contacts the left end of the slot 308 and moves the pitman 306 to the left to rock the shaft 158, which through the arm 157 and link 155 (Fig. 2), rocks the arm 147 to remove its flange 146 from beneath the pin 145 on the actuating segment 112.

The movement of the "read" key 37 through its slot 285 and the roller 286 rocks the arm 287 and roller 288 counter-clockwise, and as there is a clearance between the stud 309 and left end of the slot 307 of the pitman 306, the pitman is not moved until the projection on the end 317 of the arm 316 is raised above the path of movement of the pin 318 on the pitman 306. Immediately after the pin 318 has been freed the stud 309 strikes the left end of the slot 307 and moves the pitman 306 to the left to rock the shaft 158 in the same manner that the key 38 rocks that shaft, which, it will be recalled, is for the purpose of rocking the arm 157 (Fig. 2) counter-clockwise, whereby the link 155 rocks the arm 147 and removes the flange 146 from beneath the pin 145 on the actuating segment 112.

In connection with printing the accumulated amount on the record material during a reading operation, there is printed a character by the type wheel 170 representing a read operation. The shaft 167 upon which this type wheel is fastened, is oscillated by a partial gear 319 (Fig. 11) which is in mesh with gear teeth formed in the plate 288.

*Totalizer resetting mechanism*

When it is desired to take a reading from any of the totalizers, and leave the totalizer reset in zero position, the "reset" key 38 is operated in connection with any desired transaction key. The rear end of the "reset" key has a cam slot 325 (Figs. 9, 11 and 19) which engages a roller 326 carried on the arm 287. This cam slot is so formed that as the "reset" key is operated, the arm 287 will be moved clockwise thus moving the plate 288 to move the pin 290 away from the projection 294 of the pawl 291 and permit this pawl to be moved counter-clockwise by the spring 293, placing the shoulder 295 in the path of the pin 296 mounted in the plate 204 which will prevent movement of this plate. This movement of the plate 288 will also through the pin 230 carried by it and engaging the arm 229 of the pawl 225, rock this pawl counter-clockwise to release the plate 201. With the plate 204 thus retained and the plate 201 released, the plate 201 will be moved clockwise by the driver 205 (Fig. 17), as has been previously described. The movement of the plate 201 through the slot 200 and arm 203 has caused the totalizer to engage with the actuating segments, so that as these segments are moved counter-clockwise the totalizer wheels will rotate clockwise until the projection 297 (Fig. 22) of the transfer cams engages the noses 268 on the pawls 252 in a manner similar to that described in connection with the reading operation of the totalizer. As the plate 288 (Fig. 19) moves clockwise a pin 327, which is mounted in this plate, will disengage from a projection 328 on a pawl 329 which is pivoted at the point 292, allowing the pawl to swing clockwise, and thus placing a shoulder 330 behind the flattened side of a pin 331 carried by the plate 204, when the plate 204 is moved to the counter-clockwise limit of its movement, in which position the plate 204 will be temporarily retained. With the plate 204 retained in this operated position, the plate 201 will be moved in a counter-clockwise direction at the beginning of the return movement of the reset key, which will disengage the totalizer from the actuating segments before these segments start on their return movements, which will leave the totalizer wheels in their zero positions. As the plate 201 approaches its home position, a pin 332 carried by this plate will engage an upwardly extending projection 333 on the pawl 329 and move this pawl in a counter-clockwise direction, disengaging the shoulder 330 from the pin 331, which will allow the plate 204 to return to its home position.

As explained above, during "read" operations the pawl 234 moves behind the stud 228 (Fig. 4) to temporarily maintain the totalizer engaging plate 201 in its moved position to hold the totalizer engaged with its actuator until the amount taken therefrom is again added onto the totalizer. But, during "reset" operations it is necessary that the engaging plate 201 be returned to its normal position to disengage the totalizer from the actuators before the actuators 112 return to their normal positions, to prevent re-entry of the amount into the totalizer.

Therefore, during "reset" operations the pawl 234 must be held in its normal and ineffective position. To obtain this end a stud 334 is mounted on a curved extension on the plate 288 to hold the pawl ineffective during "reset" operations. When the plate 288 is rocked clockwise by the "reset" key 38, the stud 334 contacts the arm 237 of the pawl 234, and holds the pawl in its ineffective position, until near the end of the "reset" operation, when the plate 288 is returned by the "reset" key.

Transaction counters

A plurality of counting devices record the number of times each one of the various transaction keys has been operated. The gear segment 182 (Fig. 5), which is differentially operated by the openings 179 (Fig. 8) of the various transaction keys, meshes with a gear 337 pinned to the shaft 274 supported in the frames of the machine. Secured to and spaced at different intervals on the shaft 274 are disks 339, 340, 341, 342 and 343 (Fig. 6). Associated with each disk is a pitman 344 (Fig. 5) provided with an elongated slot 345 surrounding the shaft 274, a curved slot 346 engaging a pin 347, and an elongated slot 348 engaging a pin 349. The pin 347 is mounted in an arm 350 fastened to the key coupler shaft 56. Referring to Fig. 14, it may be seen that in two instances the arm 350 is made a part of the key coupler members 53 and 55. The pin 349 (Fig. 5) is mounted in an arm 351 of a yoke 352 (Fig. 1B) which carries a differentially tined pawl 358 for operating a counting device 353 for the "No sale" key. A similar counting device 354 is operated by the "Paid out" key, a counting device 355 is operated by the "Charge" key, and a counting device 356 is operated by the "Rec'd. on acc't." key, and a counting device 357 is operated by the "Cash" key.

The operating mechanism for each of the above counting devices is similar to that of the "No sale" counting device mechanism shown in Fig. 5. Each of the arms 351 is provided with an ear 364 extending laterally into the plane of its respective disk mounted on the shaft 274. Each pitman 344 is provided with a pin 365 which projects laterally into the plane of its respective disk. When the pin 365 is in engagement with its disk 343, as shown in Fig. 5, and the machine is operated, the pin 347 engaging the slot 346 will cause the pitman to move clockwise around the shaft 274 with the pin 365 moving around the periphery of the disk, thereby causing the arm 351, through the pin 349 and slot 348, to move clockwise on its pivot 366, thus causing the tined pawl 358 to register one on its counting device. With the parts in the positions shown in Fig. 5, the ear 364 on the arm 351 will move through space unobstructed by the disk 343. While one counting device is being operated, the other counting devices are disabled. This disabling of the other counting devices is controlled by the relative positions of the disks to the pins 365 and ears 364 (Fig. 6). It may be seen in this figure, that, with the disks positioned to register on the "No sale" counter, the ears 364 of the pitmen of all the other counting devices will engage the peripheries of their respective disks, and the pins 365 will be unobstructed by the disks, and the operation of the machine, through the pins 347 (Fig. 5) and slots 346, will move the pitmen 344 counter-clockwise, with the pins 349 acting as their pivots.

Indicators

The amounts registered are indicated both to the front and rear of the machine by a plurality of groups of indicators. These indicators include targets 370 (Figs. 2, 24A and 24B) supported in holders 371, fastened to pairs of arms 372, pivoted on the shaft 158. There are ten of these targets 370 in each group, arranged one behind the other, and having formed top loops 373 and notches 374 adapted to cooperate with notches 375 formed in a lifter bar 376 extending laterally across the machine. The arms 372 are differentially positioned to bring the various indicator targets 370 into alignment with the lifter bar 376 which raises and lowers the indicators that are brought in the plane of the bar. The arms 372 receive their differential movements from the differential mechanism, which consists of the gear segment 112 and the lever 113, which have been previously described.

The gear segment 112 and the plate 113 are each provided with a circular slot 377 into which projects a roller 378 carried on a link 379 pivoted at 380 to an arm 381 freely mounted on a rod 382 and secured to a gear segment 383 by a hub 384. The gear segment 383 is in mesh with a rack 385 secured to one of the pair of arms 372. This rack has a flange 386 (Figs. 24A and 24B) provided with ten notches 387, (Figs. 1A and 1B) which are adapted to be engaged by a downwardly extending projection 388 on the lifter bar 376. These projections are provided with a slot 389 in which the flange 386 can move when the bar 376 is in its lowered position, which is at the time the indicator frames are being differentially positioned.

Referring to Figs. 1A, 1B, 24A and 24B, it may be seen that each group of indicators is provided with similar operating mechanism. The bar 376, which is provided to raise and lower the indicators corresponding to the key depressed, is supported at each end in a channel bar 395 (Figs. 1A, 1B, 12, 24A and 24B) guided in its vertical movement by two pins 396 projecting laterally from each side frame of the machine. These channel bars are pivoted, at a point 397, to arms 398 secured on a shaft 399 supported at each end in the frame of the machine.

The shaft 399 is oscillated at the proper time during the operation of the machine to lower the last displayed indicators, and then raise the newly selected indicators into position to be seen through openings 400 in a shield 401 supported at each end by the frame of the machine. There is a similar shield placed on the other side of the indicators for the rear indication. Mounted on the key coupler shaft 56 (Fig. 12) are two arms 402 and 403 which are secured by a pin 404 to the key coupler member 72, so that these arms will oscillate with the key coupler member. Freely mounted upon the shaft 56, and placed between the arms 402 and 403, is a cam lever 405 which carries two pawls 406 and 407 mounted on opposite sides of the lever.

The cam lever 405 is provided with a cam slot 408 which cooperates with a roller 409 carried on an arm 410 secured to the shaft 399. As the key coupler member 72 moves counter-clockwise, the arm 403, which normally engages the pawl 406, will cause the cam lever 405 to move counter-clockwise and, through the slot 408, cause clockwise movement of the shaft 399, which will lower the last displayed indicators. As the cam lever 405 moves counter-clockwise, an upwardly extending projection 411 on the pawl 406 will engage the roller 409 and disengage the pawl 406 from the arm 403 against the tension of a spring 412. The cam lever 405 will remain stationary while the key coupler member continues its movement. As the key coupler member reaches its extreme counter-clockwise movement, the arm 402 will have passed a shoulder on the pawl 407 which, by the aid of a spring 413, will latch the pawl to the arm 402 and cause the cam lever 405 to return with the key coupler member moving in a clockwise direction until the roller 409 engages a projection 414 on the pawl 407, releasing the pawl from the arm 402, and permitting the cam lever 405 to stop, while the key coupler member continues its movement. By this mechanism the indicators that were in display position are lowered at the beginning of the operation of the machine, and then newly selected indicators are elevated into display position.

Referring to Figs. 1A, 1B, 24A and 24B, the first and fifth group of indicators 371, from the right-hand side of the machine, are for the dollar group of keys, and are adapted to indicate both to the front and rear of the machine, the first group on the right indicating to the rear, and the fifth group to the front of the machine. These two groups are operated in unison by the shaft 382 to which their operating gear segments 383 are pinned (Fig. 2). The second and fourth group of indicators are for the dime keys, the second group indicating to the rear of the machine, and the fourth group indicating to the front of the machine. These two groups of indicators move in unison by their operating segments being connected by a sleeve freely mounted on the shaft 382. The third group of indicators is for the penny keys, and is adapted to indicate both to the front and rear of the machine by having digits placed on both sides of each indicator target. The operating segment 383 for this group of indicators is pinned to a shaft 420, to which is also pinned one of the arms 381 connected by one of the links 379 to the differential mechanism of the penny bank. The sixth and seventh groups of indicators represent the two over-flow wheels of the totalizers, and are used when reading the total accumulation on any of the totalizers, and are adapted to indicate to the front of the machine only.

The transaction keys are represented by a group of five indicators 421 (Figs. 5 and 24A), mounted in a frame supported by a pair of arms, and differentially positioned by a segment 422 pivoted on the shaft 420. This segment is operated by an arm 423 connected by a link 424 to the gear segment 182, which is differentially positioned by the transaction keys, as heretofore described.

These transaction indicators are provided with characters placed on both sides of the indicator, so as to indicate both to the front and rear of the machine. The "read" and "reset" keys control indicators 425 and 426, respectively (Fig. 9), and a blank indicator 427 which is in display position during the time that items are entered in the machine. These three indicators are carried in a frame 428 mounted on two arms 429 pivoted on the shaft 158 similar to the other indicator arms.

Figure 10:
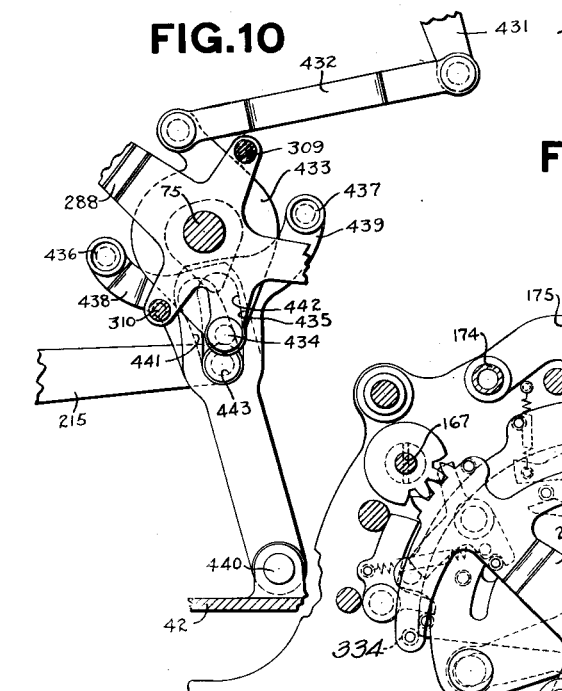
Fig. 10 is a detail view of the read and reset indicator selecting mechanism.

This indicator unit, like the other units, is operated by a gear segment 430, which is pivoted on the shaft 382 and has a downwardly extending arm 431 connected by a link 432 (Figs. 9 and 10) to a plate 433 pivoted at a point 434 to an arm 435 of the member 288. The plate 433 is adapted to be swung on its pivot, either clockwise or counter-clockwise, by two rollers 436 and 437 carried on arms 438 and 439, respectively. These arms are pivoted at a point 440 to a bracket on the case of the machine.

Each of the arms 438 and 439 is provided with slots 441 and 442 arranged in such a way that as a roller 443, carried on the arm 215, moves upwardly in these slots, the arms will be moved toward each other, engaging the rollers 436 and 437 with the plate 433, causing the plate to move, either in a clockwise or counter-clockwise direction, according to the location of the pivot 434 which is positioned by the "read" and "reset" keys through the slots 285 and 325, as previously described.

*No-sale transactions*

As is usual in cash registers, a "No-sale" key (Fig. 1A) is provided, so that the cash drawer can be opened when no amount is to be entered into the totalizer. The No-sale key 36 is one of a group of transaction keys 36, and operates the key coupler 72 in the same manner as the "Cash", "Received-on-account". "Charge", and "Paid-out" keys do. When any one of the latter four transactions are being entered, the amount keys 35 must be depressed therewith to actuate certain operating mechanism of the machine as heretofore set forth. But when the "No-sale" key is depressed no amount keys should be depressed therewith, and to provide means to actuate the said operating mechanism ordinarily actuated by the amount keys, a blank key 39 (Fig. 1B) is provided. This blank key 39 is the same in every respect as the amount keys, except that it has no opening 47, this key being provided to actuate the key coupler 54 (Fig. 2) in the same manner as the amount keys do.

The special group of indicator tablets (Fig. 5) are so arranged that the "No-sale" indicator is normally in position to be elevated. That is, when the arm 181 (Fig. 5) is not adjusted during the operation of the machine, the "No-sale" key will be elevated.

The special counter actuating mechanism is normally in position to add "1" into the "No-sale" counter. When the arm 181 is not adjusted the segment 182 remains stationary, therefore the special counter selecting disk remains stationary. When the "No-sale" key is depressed, the notch 179 thereof has no effect on the arm 181, and the disks 339, 340, 341, 342 and 343 remain stationary, and "1" is added into the "No-sale" counter.

The totalizers are arranged to normally be out of alignment with the actuators 112. When the "No-sale" key is depressed the gear 183 and totalizer selecting drum remain stationary, and therefore, no totalizer is engaged with the actuators 112 when the blank key 39 is depressed.

*Operation*

In registering a cash transaction, the operator depresses the "Cash" key, followed by depressing the amount keys represented in the transaction, which will automatically enter the amount into the "Cash" totalizer, print the amount together with the character representing cash, upon suitable record material, and indicate both to the front and rear of the machine.

Should the transaction be a "Charge", "Rec'd. on acc't." or "Paid out", the operation would be similar to that of the "Cash" transaction, the difference being in the selection of the transaction key to be operated.

In a "No sale" transaction, the "No sale" key is depressed, followed by the depressing of the blank key 39 on the right-hand side of the keyboard. The operation of the blank key corresponds to the operation of an amount key of other transactions, in that it operates the driving mechanism of the machine and is necessary in this transaction as no amount keys are depressed in a "No sales" transaction. In such transactions a character representing "No sale" will be printed upon the record material, and also indicated by the transaction indicator.

In a "reading" operation, where it is desired to print and indicate the total accumulation of any of the various totalizers, the "read" key 37 is depressed following the depression of one of the transaction keys.

In a "reset" operation, where it is desired to take a statement from the various transaction totalizers by printing the accumulated amount upon the totalizer and then resetting it to zero, the transaction key is depressed, followed by the depression of the "reset" key 38.

While the form of mechanism herein shown and described is admirably adapted to fulfill the objects primarily stated, it is to be understood that it is not intended to confine the invention to the form or embodiment herein disclosed, for it is susceptible of embodiment in various forms, all coming within the scope of the claims which follow.

What is claimed is as follows:

1. In a machine of the class described, the combination of a totalizer, an actuating means comprising two members movable in opposite directions to operate said totalizer, means for operating said actuating means, means for normally retaining one of the members of said actuating means against movement, a lever key, means operated by said lever key for making said retaining means ineffective, and means adapted to retard the movement of the other member of said actuating means while the first mentioned member is operated.

2. In a machine of the class described, the combination of complementary movable pivoted members, a pivoted differentially adjustable controlling arm mounted concentrically with said members, and means for driving one of said members against said arm to thereby adjust said members differentially.

3. In a machine of the class described, the combination of complementary movable pivoted members, a slidable actuating plate, pin and slot connections between said plate and members, means for operating said plate, and a differentially movable arm for controlling the adjustment of said members by said plate.

4. In a machine of the class described, the combination of complementary movable members pivoted on a common center, oppositely extending arms on said members, a plate slotted to slide on said center, arms on said plate, pin and slot connections between the arms on said plate and the arms on said members, means for controlling the position of adjustment of said members, and means for operating said plate for adjusting said members.

5. In a machine of the class described, the combination of complementary movable members pivoted on a common center, oppositely extending arms on said members, a plate slotted to slide on said center, arms on said plate, pin and slot connections between the arms on said plate and the arms on said members, means for controlling the position of adjustment of said members, a driving arm for operating said plate, and a connection between said driving arm and said plate comprising a pin on said arm cooperating with an arcuate slot in said plate provided with a centrally located aligning recess.

6. In a machine of the class described, the combination of complementary movable pivoted members, a pivoted arm for controlling the position of said members when a transfer or no transfer is to take place, means operating during its initial movement to move one of said members one step at the beginning of an operation and to maintain it in such moved position until near the end of an operation to permit said arm to move into position to control said members to effect a transfer, and a connection between said operating means and said members for differentially adjusting said members and then returning them to home position upon further movement of said operating means.

7. In a machine of the class described, the combination of complementary movable members, differentially positionable means for controlling the movement of said members from home position, means for driving said members under control of said differentially positionable means, operating means for said driving means cooperable with one of said members at the beginning of its movement to move said member one step from home position, and cam means on said driving means operated on during the last part of the movement of said operating means for returning said member one step to home position.

8. In a machine of the class described, the combination of complementary movable members, an arm against which said members stop in their home positions, driving means for moving said members differentially, an operating means for said driving means operable to move one of said members one step from home position and maintain it in such position until near the end of the operation to permit said arm to move one step, and means on said driving means operated upon by said actuating means to return said arm into its home position near the end of the operation of the machine.

9. In a machine of the class described, the combination of differentially movable complementary members, an arm against which said members are driven both when a transfer and no transfer is made, driving means for said members, operating means for said driving means, a cam on one of said members operated upon by said driving means to move it one step from home position to permit said arm to move to cause a transfer to be effected, and a cam on said driving means operated upon by said actuating means for moving said driving means and said members and said arm to home position.

10. In a machine of the class described, the combination of complementary movable pivoted members, an arm against which said members are stopped in their home positions, an arm for controlling the differential movement of said members from home position, driving means therefor, actuating means for said driving means, means on one of said members operated upon by said actuating means at the beginning of an operation to move it forward one step and at the end of an operation to permit it to be moved backward one step, connections between said driving means and members to move said members differentially as controlled by said second mentioned arm and to return said first mentioned arm to home position, and operating means for moving said actuating means to cause said first mentioned arm to move one step from home position at the beginning of an operation and to return home at the end of an operation and to give said driving means movement for operating said members differentially and returning them against said first mentioned arm.

11. In a machine of the class described, the combination of complementary movable members, a differentially movable arm for controlling the movement of said members from home position, keys for positioning said second mentioned arm, a key coupler operated by said keys, a second arm for stopping said members in a position to effect a transfer and in their home position after a transfer has been effected and also when no transfer is effected, means for holding one of said members one step from home position to permit said arm to move to cause a transfer, to drive said members differentially and to return to home position said one member when no transfer has been effected and both members when a transfer has been effected, means for latching said first mentioned arm in either position, and means operated by the key coupler for releasing said latching means as said first mentioned arm is returned to home position.

12. In a machine of the class described, the combination of a totalizer actuator, interspersed totalizer elements selectively movable into mesh with said actuator, a U-shaped member, oppositely facing inwardly extending aligner projections on said member, one of the legs of said member and its projection being slotted to receive the actuator to align only the wheels not in mesh with the actuator; and means for causing said aligner projections to function alternately.

13. In a machine of the class described, the combination of a totalizer actuator, interspersed totalizer elements selectively movable into mesh with said actuator, a U-shaped member oppositely facing inwardly extending aligner projections on said member, one of the legs of said member and its projection being slotted to receive the actuator to align only the wheels not in mesh with the actuator, means for engaging said totalizer elements with said actuator, means permitting the normally functioning aligner projection to follow the totalizer into mesh with the actuator, and means for causing said projection to positively disengage from the totalizer elements, and the other projection to engage with the totalizer elements not in mesh with the actuator.

14. The combination of totalizer elements, actuators therefor, a frame for said totalizer elements, a shaft pivotally supporting said frame, a U-shaped aligner pivotally supported on said frame with its legs straddling said shaft, aligning projections on the legs of said U-shaped member located on opposite sides of said totalizer elements, means for rocking said shaft to engage the totalizer elements with the actuators, and a stop cooperating with said aligner to arrest it and to cause it to move one of its aligning projections out of functioning and the other into functioning position.

15. In a machine of the class described, the combination of a totalizer, an actuating member adapted to operate said totalizer, a plurality of lever keys adapted to differentially operate said actuating member, a separate lever key adapted to cause said actuating member to be differentially operated to an extent controlled by said totalizer, and means operated by said separate lever key for controlling the engaging and disengaging of said totalizer with said actuating member.

16. In a machine of the class described, the combination of a totalizer, an actuating member adapted to operate said totalizer, a plurality of lever keys adapted to differentially operate said actuating member, a separate lever key adapted to cause said actuating member to be differentially operated an extent controlled by said totalizer, means for normally disabling said actuating member, and means operated by said separate lever key for making said disabling means ineffective.

17. In a machine of the class described, the combination of a totalizer, an actuating member adapted to operate said totalizer, a plurality of lever keys adapted to differentially operate said actuating member, and a separate lever key adapted to cause said actuating member to be differentially operated an extent controlled by said totalizer.

18. In a machine of the class described, the combination of a totalizer, actuators therefor, complementary movable members one of which effects engagement of the totalizer with the actuators, means normally locking said one member, and means on the other member for releasing said locking means after a predetermined movement of said other member.

19. In a machine of the class described, the combination of a totalizer, actuators therefor, complementary movable members one of which effects engagement of the totalizer with the actuators, means normally locking said one member, means on the other member for releasing said locking means after a predetermined movement of said other member, and manipulative means for releasing said locking means at the beginning of an operation.

20. In a machine of the class described, the combination of a totalizer, actuators therefor, complementary movable members one of which effects engagement of the totalizer with the actuators, means normally locking said one member, means on the other member for releasing said locking means after a predetermined movement of said other member, a lock for said other member normally in ineffective position, and manipulative means for moving said first locking means into ineffective position and said second locking means into effective position.

21. In a machine of the class described, the combination of a totalizer, actuators therefor, complementary movable members one of which effects engagement of the totalizer with the actuators, means normally locking said engaging member, a normally effective lock for each of said members, means for unlocking said engaging member and for moving the normally ineffective locks of both members into effective position, and means for releasing the one of the last mentioned locks cooperating with the other of said members after the totalizer has been engaged.

In testimony whereof I affix my signature.

JOHN P. FRANK.